(12) United States Patent
Gibbs et al.

(10) Patent No.: US 12,103,429 B1
(45) Date of Patent: Oct. 1, 2024

(54) METHOD AND APPARATUS FOR A MULTI-CELL RECHARGEABLE ENERGY STORAGE DEVICE

(71) Applicant: GM GLOBAL TECHNOLOGY OPERATIONS LLC, Detroit, MI (US)

(72) Inventors: James C. Gibbs, Brighton, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 18/315,875

(22) Filed: May 11, 2023

(51) Int. Cl.
*H01M 10/48* (2006.01)
*B60L 3/00* (2019.01)
*B60L 58/18* (2019.01)
*H02J 7/00* (2006.01)

(52) U.S. Cl.
CPC ............. *B60L 58/18* (2019.02); *B60L 3/0046* (2013.01); *H01M 10/482* (2013.01); *H02J 7/0047* (2013.01); *H01M 2220/20* (2013.01)

(58) Field of Classification Search
CPC ....................................................... B60L 58/18
See application file for complete search history.

(56) References Cited

U.S. PATENT DOCUMENTS

| | | | | |
|---|---|---|---|---|
| 5,811,890 A | * | 9/1998 | Hamamoto | H02J 9/061 307/66 |
| 9,837,811 B2 | * | 12/2017 | Yamaguchi | H02J 7/00302 |
| 10,369,900 B1 | * | 8/2019 | Conlon | H02J 7/00047 |
| 2002/0070709 A1 | * | 6/2002 | Small | H02J 7/0045 320/150 |
| 2015/0244193 A1 | * | 8/2015 | Wang | H02J 7/007184 320/132 |
| 2019/0074556 A1 | * | 3/2019 | Onoda | H01M 10/425 |

* cited by examiner

*Primary Examiner* — Jared Fureman
*Assistant Examiner* — Esayas G Yeshaw
(74) *Attorney, Agent, or Firm* — Quinn IP Law (57) ABSTRACT

A method and a system for a high-voltage (HV) battery pack having multiple rechargeable energy storage devices (RESSs) that are connectable to an external load via a power bus via a pre-charge circuit in parallel with a first electrical contactor. The RESSs are monitored via current sensors. The current sensors monitor current levels between the RESSs and the power bus, detect a low current level from one of the current sensors, identify one of the RESSs associated with the low current level, activate the respective pre-charge circuit, monitor the electrical current, and determine a state of the respective first electrical contactor based upon the electrical current.

20 Claims, 4 Drawing Sheets

METHOD AND APPARATUS FOR A MULTI-CELL RECHARGEABLE ENERGY STORAGE DEVICE

INTRODUCTION

A portable electric power source, such as a rechargeable energy storage device, may be employed in a stationary energy storage system or in a mobile device, e.g., as part of an electrified vehicle (EV). When employed as part of an EV, an electrified powertrain employs one or multiple electric machines to generate torque employing energy derived at least in part from the rechargeable energy storage device, with the generated torque being delivered to a drivetrain for tractive effort.

A rechargeable energy storage device, such as a high-voltage (HV) battery pack, may employ multiple rechargeable electrical energy storage devices (RESSs) that may be connected to a high-voltage power bus employing electrical contactors.

Under certain operating conditions, such as low electrical loads, it may be difficult to quickly detect which (if any) of the RESSs is no longer electrically connected to the high-voltage power bus, due to factors related to variations in temperature, charge capacity, internal resistance, age, etc. It may take more time than desired to detect that one of the RESSs is not contributing, unless the RESSs are under high load. This may lead to an imbalance in the states of charge of the RESSs. When an imbalance occurs, the RESS that became disconnected cannot be easily or readily reconnected due to a potential for a high in-rush current with associated risks.

The hardware of a contactor may not be able to automatically re-close if inadvertently opened, and instead may require an open/closed cycle with sufficient dwell time to avoid risks. Errors in determining whether a contactor is in an open state or a closed state may result in inadvertently opening a contactor that was closed. The dynamic nature of battery usage makes it undesirable to deactivate a contactor during operation. If the system is trying to detect if a contactor has inadvertently opened, it needs to be sure the contactor is deactivated before commanding an open/closed cycle to re-close it.

SUMMARY

On a high-voltage (HV) battery pack that employs multiple rechargeable electrical energy storage devices (RESSs) that are connected to a high-voltage power bus employing electrical contactors, there is a need for a system and method to determine whether one or more of the electrical contactors is in a deactivated state during operation.

The concepts described herein provide a system and method to determine whether one or more of the electrical contactors that connect rechargeable electrical energy storage devices (RESSs) of a HV battery pack to a HV bus are in an activated state, to avoid issues such as a risk of an imbalance in the states of charge of the RESSs during operation.

An aspect of the disclosure may include a system for a high-voltage (HV) battery pack that includes a plurality of rechargeable energy storage devices (RESSs), the plurality of RESSs being electrically connectable to an external load via a high-voltage electric power bus; a plurality of current sensors; a plurality of pre-charge circuits arranged in parallel with a corresponding plurality of first electrical contactors; and a controller. The controller is in communication with the plurality of current sensors, and operatively connected to the plurality of first electrical contactors and the plurality of pre-charge circuits. Each of the plurality of RESSs is monitored via one of the plurality of current sensors, and each of the plurality of RESSs is electrically connectable to the high-voltage electric power bus via a respective one of the plurality of pre-charge circuits that is arranged in parallel with a respective one of the plurality of first electrical contactors. The controller includes an instruction set that is executable to monitor, via the plurality of current sensors, a plurality of current levels between the plurality of RESSs and the high-voltage electric power bus, detect a low current level from one of the plurality of current sensors, identify one of the RESSs corresponding to the one of the plurality of current sensors associated with the low current level, activate the respective one of the pre-charge circuits corresponding to the one of the RESSs, monitor, via the one of the plurality of current sensors, an electrical current for the one of the RESSs, and determine a state of the respective first electrical contactor based upon the electrical current for the one of the RESSs.

Another aspect of the disclosure may include the instruction set being executable to determine the state of the respective first electrical contactor based upon the electrical current by determining that the respective first electrical contactor is in a deactivated state when the electrical current is greater than a threshold current when the respective pre-charge circuit is activated.

Another aspect of the disclosure may include the instruction set being executable to detect the low current level from one of the plurality of current sensors by detecting that one of the plurality of current levels is less than a minimum threshold current level.

Another aspect of the disclosure may include the plurality of RESSs being electrically connectable in series to the external load via the high-voltage electric power bus.

Another aspect of the disclosure may include a subset of the plurality of RESSs being electrically connectable in parallel to the external load via the high-voltage electric power bus.

Another aspect of the disclosure may include each of the plurality of pre-charge circuits being a controllable switch connected in series with a resistor.

Another aspect of the disclosure may include instruction set being executable to activate the respective one of the pre-charge circuits corresponding to the one of the RESSs, monitor, via the plurality of current sensors, a plurality of electrical current levels between the plurality of RESSs and the high-voltage electric power bus, and determine a state of the respective first electrical contactor based upon the electrical current for the one of the RESSs and the plurality of electrical current levels between the plurality of RESSs and the high-voltage electric power bus.

Another aspect of the disclosure may include the instruction set being executable to determine the state of the respective first electrical contactor based upon the plurality of electrical current levels between the plurality of RESSs and the high-voltage electric power bus by determining that the respective first electrical contactor is in a deactivated state when the plurality of electrical current levels between the plurality of RESSs and the high-voltage electric power bus reflect a corresponding change.

Another aspect of the disclosure may include the instruction set being executable to re-activate the respective first electrical contactor when it is determined that the respective first electrical contactor is deactivated.

Another aspect of the disclosure may include the instruction set being executable to determine the state of the respective first electrical contactor based upon the electrical current comprises the instruction set being executable to determine that the respective first electrical contactor is in an activated state when a change in the electrical current is less than a threshold current when the respective pre-charge circuit is activated.

Another aspect of the disclosure may include a method for monitoring a high-voltage (HV) battery pack that is configured as a plurality of rechargeable energy storage devices (RESSs) that are electrically connectable to a high-voltage electric power bus via a first contactor and a pre-charge circuit. The method includes monitoring, via a plurality of sensors, a plurality of power levels between the plurality of RESSs and the high-voltage electric power bus, detecting a low power level from one of the plurality of sensors, identifying one of the RESSs corresponding to the one of the plurality of sensors associated with the low power level, activating a respective one of the pre-charge circuits corresponding to the one of the RESSs, monitoring, via the one of the plurality of sensors, an electrical power for the one of the RESSs, and determining a state of the respective first electrical contactor based upon the electrical power for the one of the RESSs.

Another aspect of the disclosure may include determining the state of the respective first electrical contactor based upon the electrical power by determining that the respective first electrical contactor is in a deactivated state when the electrical power is greater than a threshold power when the respective pre-charge circuit is activated.

Another aspect of the disclosure may include detecting the low power level from one of the plurality of sensors includes detecting that one of the plurality of power levels is less than a minimum threshold power level.

Another aspect of the disclosure may include the aforementioned system being executed on-vehicle.

The above summary is not intended to represent every possible embodiment or every aspect of the present disclosure. Rather, the foregoing summary is intended to illustrate some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." For example, "optimal vehicle routes" may include one or more optimal vehicle routes. Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The following detailed description is merely illustrative in nature and is not intended to limit the application and uses. Furthermore, the drawings are in simplified form and are not to precise scale. Throughout the drawings, corresponding reference numerals indicate like or corresponding parts and features. Furthermore, there is no intention to be bound by an expressed or implied theory presented herein. Furthermore, the disclosure, as illustrated and described herein, may be practiced in the absence of an element that is not specifically disclosed herein.

For purposes of convenience and clarity, directional terms such as top, bottom, left, right, up, over, above, below, beneath, rear, and front, and similar expressions are employed for description, and are not to be construed to limit the scope of the disclosure. The use of ordinals such as first, second and third does not imply a ranked sense of order, but rather may distinguish between multiple instances of an act or structure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
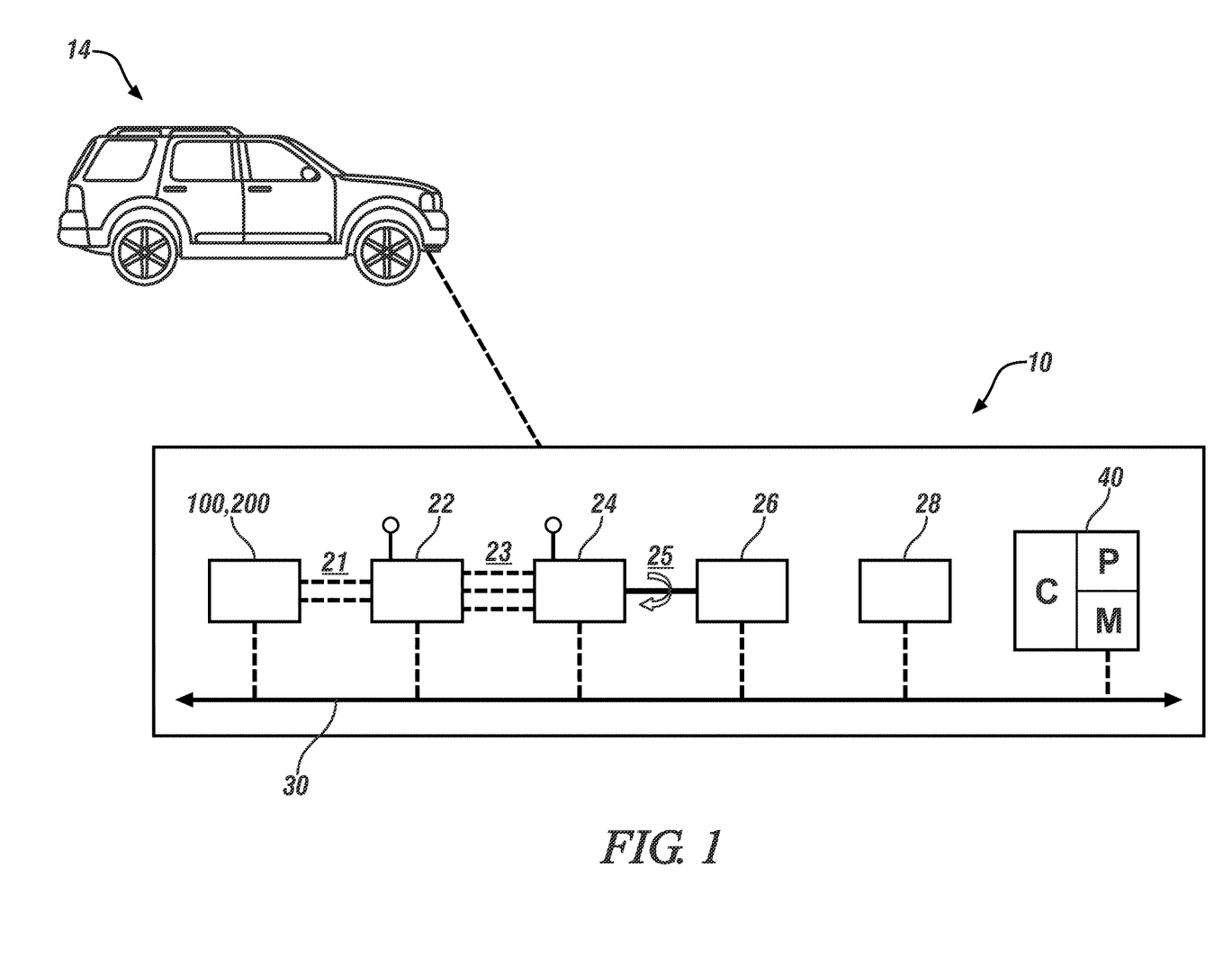
FIG. 1 schematically illustrates a vehicle including a high-voltage (HV) battery pack that is composed of a plurality of rechargeable energy storage devices (RESSs), in accordance with the disclosure.
Figure 2:
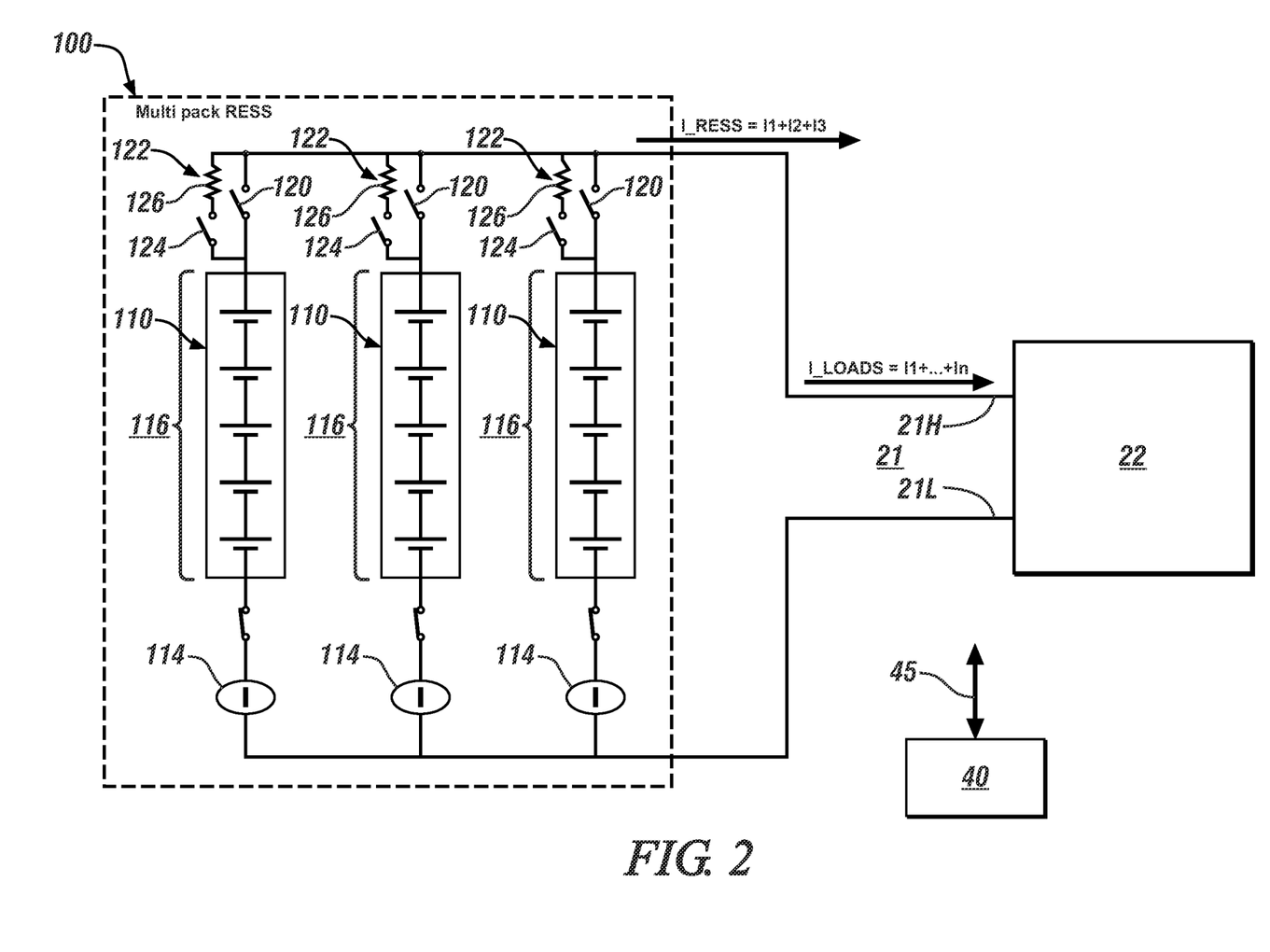
FIG. 2 schematically illustrates an embodiment of a HV battery pack that is composed of a plurality of rechargeable energy storage devices (RESSs) that are electrically connectable in parallel to an external load via respective electrical contactors and a HV bus, in accordance with the disclosure.
Figure 3:
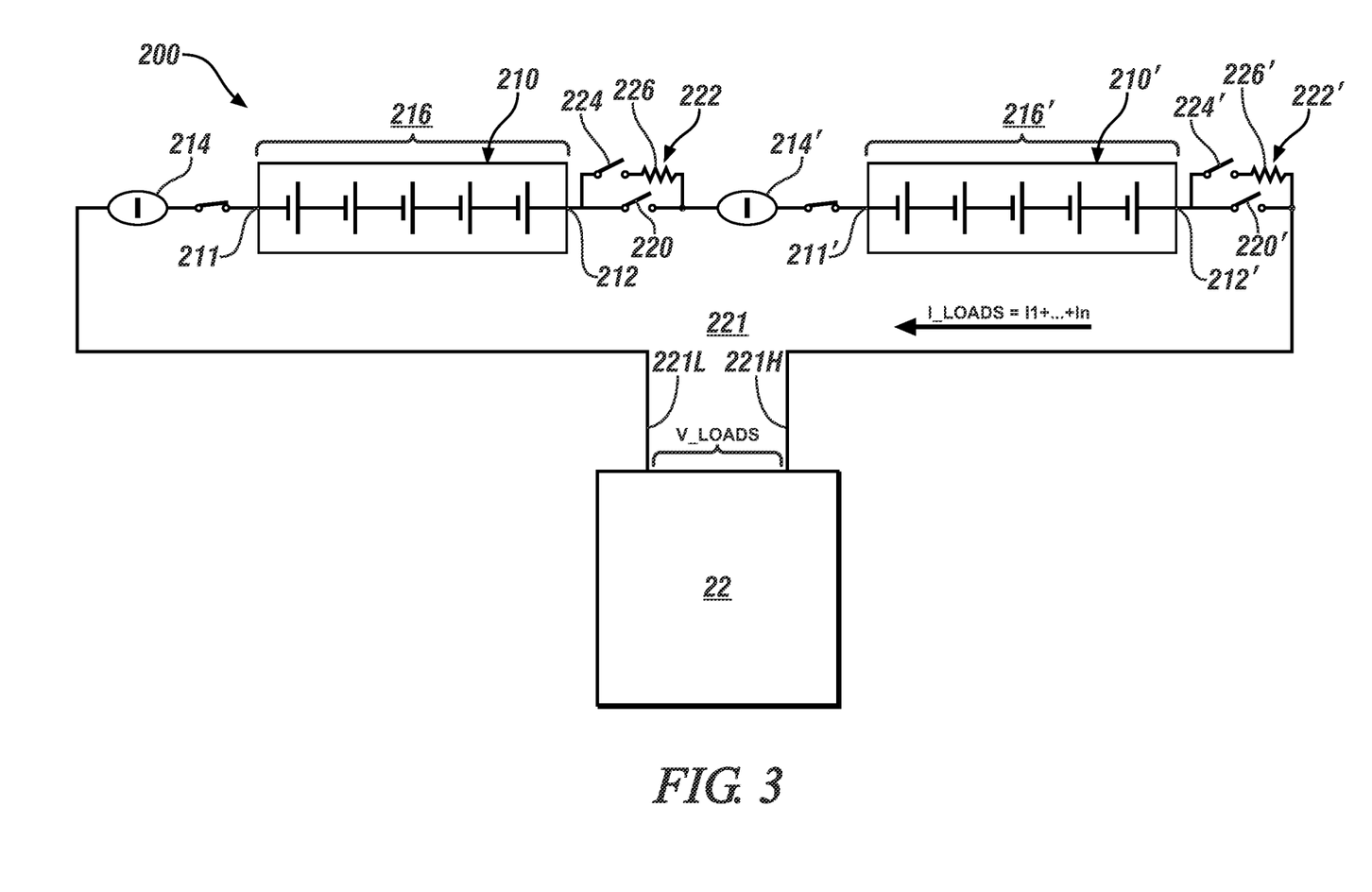
FIG. 3 schematically illustrates an embodiment of a HV battery pack that is composed of a plurality of rechargeable energy storage devices that are electrically connectable in series to an external load via respective electrical contactors and a HV bus, in accordance with the disclosure.

Referring to the drawings, wherein like reference numbers refer to like components, FIGS. 1, 2 and 3 schematically illustrate various elements and embodiments of an electric drive system 10 arranged to supply tractive torque for a vehicle 14. Operation of the electric drive system 10 is controlled by a controller C 40. The electric drive system 10 may be a wholly electric drive system, a series-hybrid drive system, or a parallel-hybrid drive system, and employs one or multiple rotary electric machines to generate mechanical torque. The vehicle 14 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drive system 10 may be arranged to supply torque to a stationary system. It is to be understood that the electric drive system 10 may take many different forms and have additional components.

The electric drive system 10 includes a high-voltage (HV) battery pack 100. As described with reference to FIGS. 2 and 3, the HV battery pack 100 advantageously employs a plurality of rechargeable electrical energy storage devices (RESSs) 110 and 210 that are connectable to a high-voltage electric power bus (HV bus) 21 employing a corresponding plurality of first electrical contactors 120 and 220.

Referring again to FIG. 1, the electric drive system 10 includes a power inverter 22 and rotary electric machine 24. The HV battery pack 100 is electrically connected to the power inverter 22 via the HV bus 21, and the power inverter 22 is connected to the rotary electric machine 24 via electrical conductors 23. The rotary electric machine 24 is mechanically coupled to a propulsion unit 26 via a rotatable member 25. The HV battery pack 100 may be a traction battery pack for generating high-voltage power that may be directed to the propulsion unit 26, via the rotary electric machine 24, and for operating other electrical systems 28 in the vehicle 14. The HV battery pack 100 may include battery cells of various chemistries, e.g., lithium-ion, lithium-metal, etc., without limitation. In one example, the power inverter 22 is a three-phase three-wire voltage-source inverter. In some embodiments, the power inverter 22 may be part of a power inverter module of the electric vehicle 14. In order to generate tractive power with sufficient vehicle range, torque, and speed, the HV battery pack 100 in the electric vehicle 14 may be larger and higher in capacity than a nominal 12-volt starting, lighting, and ignition battery. As illustrated with reference to FIGS. 2 and 3, sensors and other monitoring elements (not shown) may be arranged to monitor electrical parameters (e.g., voltage, current) and mechanical parameters (e.g., speed) at various locations.

Referring again to FIG. 1, the HV battery pack 100 may be attached to an underbody portion of the vehicle 14 in one embodiment. The HV battery pack 100 may be located between left and right front wheels in one embodiment. Alternatively, the HV battery pack 100 may be located between left and right rear wheels in one embodiment. Alternatively, the HV battery pack 100 may be located between the front and rear wheels in one embodiment.

The rotary electric machine 24 electrically connects to the HV battery pack 100 via HV bus 21 and the power inverter 22. The power inverter 22 is configured with control circuits including power transistors, e.g., IGBTs for transforming high-voltage DC electric power to high-voltage AC electric power and transforming high-voltage AC electric power to high-voltage DC electric power. The power inverter 22 may employ pulsewidth-modulating (PWM) control of the IGBTs to convert stored DC electric power originating in the HV battery pack 100 to AC electric power to drive the rotary electric machine 24 to generate torque. Similarly, the power inverter 22 converts mechanical power transferred to the rotary electric machine 24 to DC electric power to generate electric energy that is storable in the HV battery pack 100, including as part of a regenerative braking control strategy. The power inverter 22 receives motor control commands and controls inverter states to provide the motor drive and regenerative braking functionality. In one embodiment, a DC/DC electric power converter electrically connects to the HV bus 21 to provide electric power to a low-voltage battery via a low-voltage bus. The low-voltage battery electrically connects to an auxiliary power system to provide low-voltage electric power to low-voltage systems on the vehicle, including, e.g., electric windows, HVAC fans, seats, and other devices. The controller 40 is operatively connected to the power inverter 22 to control transfer of electric power between the HV battery pack 100 and a plurality of radially oriented electrically conductive windings of a stator of the rotary electric machine 24. The controller 40 controls the power inverter 22 to sequentially electrically activate electrically conductive windings to exert a rotating magnetic force on a rotor of the rotary electric machine 24 to effect rotation, or to react torque to retard rotation during regenerative operation.

Motors, generators, and other types of electric machines are often embodied as alternating current (AC) torque-generating devices. When the rotary electric machine is energized by a direct current (DC) voltage from a multi-cell battery pack or other DC power supply, a power inverter produces a desired polyphase AC output voltage. For example, a three-phase AC power inverter uses three separate phase inverters each having semiconductor switching components, e.g., IGBTs, MOSFETs, or thyristors. The on/off states of the switching components for a given electrical phase are controlled to produce the desired AC output voltage. The AC output voltage is thereafter supplied to a corresponding phase winding of the rotary electric machine.

Referring again to FIG. 1, the electric drive system 10 includes controller C 40 having a processor P and memory M that have been adapted to regulate the operation of various onboard systems and components in the vehicle 14. The controller C 40 is communicatively connected with the power inverter 22 to control the rotary electric machine 24 to control bi-directional transfer of energy between the HV battery pack 100 and the rotary electric machine 24 in either a motoring mode or a regenerative mode. The rotary electric machine 24 may operate using a three-phase AC current. In such an instance, the power inverter 22 is governed by the controller C 40 to convert the DC voltage (provided by the HV battery pack 100) to a three-phase AC voltage for use by the rotary electric machine 24 to generate torque when operating in the motoring mode. In the regenerative mode, the power inverter 22 converts AC power from the rotary electric machine 24 to DC power compatible with and storable on the HV battery pack 100. It is understood that the electric drive system 10 may include additional components not shown.

The various components of the electric drive system 10 may be in communication with the controller C 40 (and each other) via a communication network 30, which may be one or more of a wired network, a short-range wireless network, or a long-range wireless network. Additionally, the various components of the electric drive system 10 may include physical wired connections. The communication network 30 may be a communication BUS, which may be in the form of a serial Controller Area Network (CAN-BUS). The communication network 30 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

The controller C 40 is programmed to receive a torque command in response to an operator input (e.g., through an accelerator pedal or brake pedal) or an automatically fed input condition monitored by the controller C 40. Upon receipt of the torque command, the controller C 40 is programmed to transmit a command signal to the power inverter 22 to regulate a transfer of electrical power between the HV battery pack 100 and the rotary electric machine 24. One technique employed to obtain a variable frequency, variable voltage or variable power from a power inverter 22 operating from a rechargeable energy storage device such as the HV battery pack 100 is the pulse width modulation ("PWM") technique. A switching frequency of the PWM signal determines how fast the PWM completes a cycle, and therefore how fast it switches between high and low states. In other words, the PWM switching frequency corresponds to the rate at which the DC voltage is switched on and off during the PWM process in a switching power supply. There are various PWM techniques which may be implemented, such as for example, sinusoidal PWM (SPWM), space vector PWM (SVPWM), zero-vector modulation (ZVM) and discontinuous PWM (DPWM). These techniques differ in terms of their voltage linearity range, ripple voltage/current, switching losses, and high frequency common mode voltage or current properties.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

FIG. 2 schematically illustrates an embodiment of the HV battery pack 100 that is composed of a plurality of rechargeable energy storage devices (RESSs) 110 that are electrically connectable via respective first electrical contactors 120 and the HV bus 21 to an external load, e.g., the power inverter 22 that is described with reference to FIG. 1.

The RESSs 110 of the HV battery pack 100 may be connected in parallel, as shown. Alternatively, or in addition, the RESSs 110 of the HV battery pack 100 may be connected in series, in parallel, or a combination thereof to provide electric power at a predetermined voltage level.

Each of the RESSs 110 is, in one embodiment, an electrochemical device that may be employed to store and release electric power that may be employed by an electric circuit or an electric machine to perform work, such as for communications, display, or propulsion. In one embodiment, the electrochemical device is arranged as a lithium battery, which is a rechargeable electrochemical device that operates by reversibly passing lithium ions between a negative electrode (or anode) and a positive electrode (or cathode).

Each of the RESSs 110 is monitored by a current sensor 114 and a voltage sensor 116. The current sensor 114 and voltage sensor 116 detect parameters related to electric power level and electric power potential, respectively, for the respective RESS 110. The current sensors 114 and voltage sensors 116 communicate with the controller 40 via a wired or a wireless communication link 45 that is in communication with the communication network 30.

Each of the RESSs 110 is electrically connectable to the HV bus 21 via a first electrical contactor 120 that is arranged in parallel with a pre-charge circuit 122. The pre-charge circuit 122 includes a controllable switch 124, e.g., a second electrical contactor 124, which is arranged in series with a resistor 126 between the RESS 110 and the HV bus 21. The first electrical contactor 120 and the second electrical contactor 124 for each of the plurality of RESSs 110 are operatively connected to the controller 40, which controls activation thereof.

In one embodiment, the first electrical contactor 120 is arranged as an electromechanical device that employs one or multiple electromagnetic solenoids to activate and deactivate one or multiple pairs of electrical contacts to form an electrical connection. In one embodiment, the first electrical contactor 120 is arranged as a normally-open device that requires an electrical command signal from the controller 40 to achieve a closed or activated state.

In one embodiment, the second electrical contactor 124 is arranged as an electromechanical device that employs one or multiple electromagnetic solenoids to activate and deactivate one or multiple pairs of electrical contacts to form an electrical connection. Alternatively, the second electrical contactor 124 is arranged as a solid-state contactor. In one embodiment, the second electrical contactor 124 is arranged as a normally-open device that requires an electrical command signal from the controller 40 to achieve a closed or activated state.

As such, each of the plurality of RESSs 110 is electrically connectable to the HV bus 21 via activation of a respective one of the plurality of first electrical contactors 120. Furthermore, each of the plurality of RESSs 110 is electrically connectable to the HV bus 21 via activation of a respective one of the second electrical contactors 124 of a respective one of the plurality of pre-charge circuits 122.

FIG. 3 schematically illustrates an embodiment of a HV battery pack 200 that is composed of a plurality of rechargeable energy storage devices (RESSs) 210, 210', respectively, which are electrically connectable to an external load, e.g., the power inverter 22 described with reference to FIG. 1, via HV bus 221 that includes a low side 221L and a high side 221H.

In this illustration, the first and second RESSs 210, 210' are connected in series to provide electric power at a predetermined voltage level.

In this embodiment, an anode 211 of the first RESS 210 connects to the low side 221L of the HV bus 221 via one of the first electrical contactors 220. One of the current sensors 214 is arranged to monitor current level thereto, and one of the voltage sensors 216 is arranged to monitor electrical potential across the first RESS 210.

In this embodiment, a cathode 212 of the first RESS 210 connects to an anode 211' of the second RESS 210' via one of the pre-charge circuits 222 and one of the first electrical contactors 220.

In this embodiment, a cathode 212' of the second RESS 210' connects to the high side 221H of the HV bus 221 via another of the pre-charge circuits 222. Another of the current sensors 214 is arranged to monitor current level thereto, and another of the voltage sensors 216 is arranged to monitor electrical potential across the second RESS 210'.

Each of the pre-charge circuits 222 includes a controllable switch 224, e.g., a second electrical contactor 224, which is arranged in series with resistor 226.

A first of the pre-charge circuits 222 is arranged in parallel with one of the first electrical contactors 220 between cathode 212 of the first RESS 210 and anode 211 of the second RESS 210'.

A second of the pre-charge circuits 222 is arranged in parallel with one of the first electrical contactors 220 between cathode 212 of the second RESS 210 and the high side 221H of the HV bus 221.

The first electrical contactor 220 and the second electrical contactor 224 for each of the first and second RESSs 210, 210' are operatively connected to the controller 40, which controls activation thereof.

As is appreciated, the arrangement of the HV battery pack 200 that is composed of a plurality of rechargeable energy storage devices (RESSs) 210, 210', respectively, arranged in series may be a stand-alone arrangement in one embodiment. Alternatively, the HV battery pack 200 may be incorporated as one of the RESSs 110 of the HV battery pack 100 that is described with reference to FIG. 2.

Figure 4:
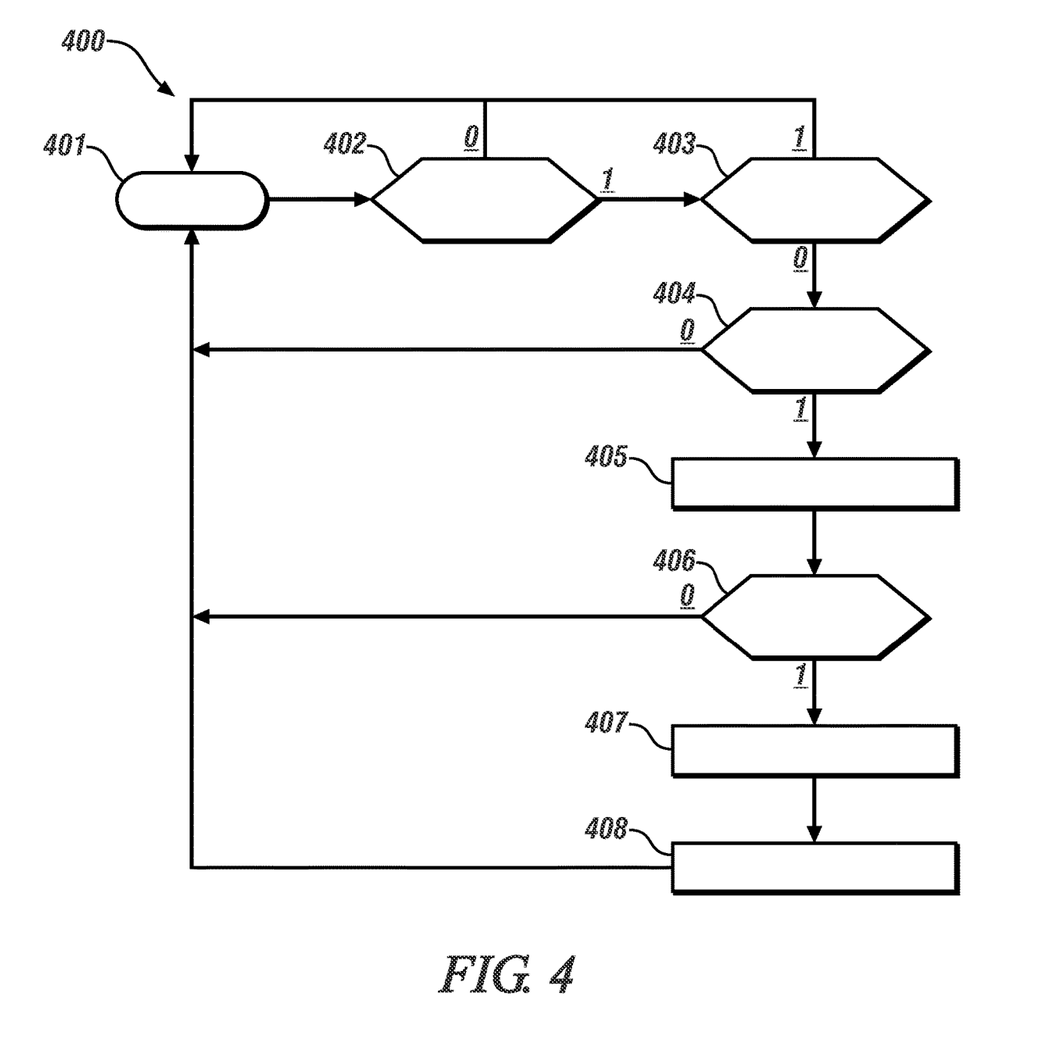
FIG. 4 schematically illustrates, in flowchart form, a process for monitoring an embodiment of a HV battery pack including a plurality of RESSs to determine whether one of the electrical contactors has opened, in accordance with the disclosure.

FIG. 4 schematically illustrates, in flowchart form, a process 400 for monitoring a HV battery pack 100 that includes a plurality of RESSs 110, and is described with reference to elements set forth with reference to FIGS. 1, 2, and/or 3. The process 400 may be stored in the memory M and executed by the processor P of the controller 40. The process 400 executes to determine whether one of the first electrical contactors 120 that connects the plurality of RESSs 110 to the HV bus 21 has opened, i.e., is deactivated. This includes determining whether one of the first electrical contactors 120 has opened, either inadvertently, or due to a fault, or due to a control error from the controller 40. This process 400 addresses an operating condition wherein one of the RESSs 110 may be disconnected, such as when a fault occurs in a respective one of the first electrical contactors 120. The process 400 may be reduced to practice as one or more instruction sets in the form of algorithmic code that may be executed by the controller 40.

The process 400 may be executed in response to a triggering event, or the process 400 may be periodically executed during ongoing operation (Step 401).

The process 400 includes monitoring current levels between the plurality of RESSs 110 and the HV bus 21, and associated voltage levels, employing the plurality of current sensors 114 and voltage sensors 116, respectively, (Step 402). As such, the concepts described herein may be employed to monitor and act upon, current, voltage, total electrical power, or another related electrical parameter.

The current levels and associated voltage levels are monitored between the plurality of RESSs 110 and the HV bus 21 to detect unexpected values in the current levels, or detect unexpected trends in the voltage levels of the plurality of RESSs 110. When there are no unexpected values in the current levels and no unexpected trends in the voltage levels of the plurality of RESSs 110 (Step 402) (0), this iteration of the process 400 ends without further action.

When a signal output from one of the current sensors 114 indicates a current drop to at or near zero current from one of the RESSs 110, or when a signal output from one of the voltage sensors 116 is not trending in a manner that is consistent with voltages of others of the RESSs 110 (Step 402) (1), the RESS 110 associated with the low current level or the unexpected voltage level is identified as a suspect RESS. The signal outputs from the current sensors 114 are monitored to determine whether the signal outputs from the current sensors 114 were trending in the same direction as the signal output from the current sensor 114 associated with the suspect RESS (Step 403).

When the signal outputs from the current sensors 114 are trending in the same direction as the signal output from the current sensor 114 associated with the suspect RESS (Step 403)(1), this iteration of the process 400 ends without further action.

Otherwise (Step 403(0)), the signal output from the current sensor 114 associated with the suspect RESS is evaluated by executing a rationality check related to the power load on the HV bus 21 (Step 404). When there is a change in the signal output from the current sensor 114 associated with the suspect RESS without a corresponding change in the power load on the HV bus 21, it may indicate a faulty sensor (Step 404(0)), and this iteration of the process 400 ends without further action.

When there is a change in the signal output from the current sensor 114 associated with the suspect RESS that corresponds to a change in the power load on the HV bus 21, it may indicate a fault associated with the first electrical contactor 120 for the suspect RESS (Step 404(1)), with a need to execute further analysis and testing.

As previously described, each of the first electrical contactors 120 is electrically connected in parallel with a pre-charge circuit 122 that includes a second electrical contactor 124 arranged in series with a resistor 226.

When a low current level from one of the plurality of current sensors 114 is detected, the second electrical contactor 124 for the respective pre-charge circuit 122 corresponding to the suspect RESS 110 is activated, and electrical current for the suspect RESS 110 is monitored via the respective current sensor 114 (Step 405). Activating the respective pre-charge circuit 122 corresponding to the suspect RESS 110 may be in the form of activating for a period of time and deactivating the second electrical contactor 124, and measuring the current and voltage for the suspect RESS 110 employing the respective current sensor 114 and voltage sensor 116. Activating the respective pre-charge circuit 122 corresponding to the suspect RESS 110 may be in the form of a pulsewidth-modulated activation of the second electrical contactor 124 for a period of time, and measuring the current and voltage for the suspect RESS 110 employing the respective current sensor 114 and voltage sensor 116.

The measured current and voltage for the suspect RESS 110 are evaluated to determine whether there were corresponding, synchronous changes associated with the activation of the pre-charge circuit 122 (Step 406).

When there were corresponding, synchronous changes associated with the activation of the pre-charge circuit 122 (Step 406) (1), it is determined that the first electrical contactor 120 is deactivated or open (Step 407), and a series of activation steps are executed to activate the first electrical contactor 120 (Step 408).

When there were no corresponding, synchronous changes associated with the activation of the pre-charge circuit 122 (Step 406) (0), this iteration ends without a result.

The concepts described herein provide a system and method to positively verify whether the RESSs are electrically connected to the HV bus via the first contactors. When a status of an RESS connection cannot be positively verified, such as during a low load operating condition, the pre-charge circuit may be employed during RESS operation to intrusively electrically load a suspect RESS to verify an electrical connection. This may decrease the amount of time needed to detect a contactor that has become open without unnecessarily cycling the contactor being verified.

The use of the pre-charge circuit, outside its intended purpose of pre-charging a load capacitance, creates a current path in parallel to one or more of the first contactors in order to diagnose the physical position of the first contactor, without a need for additional sensing hardware such as switch position hardware. The voltage and current variations in a system for an embodiment of the HV battery pack when a pre-charge device is activated is predictable, and thus may be employed to verify the actual state of the main contactor.

The concepts include a system and methodology to detect when a first contactor has reverted to the deactivated state for an individual RESS in a multi RESS system, employing a pre-charge circuit. The concepts include a system and methodology to isolate a first contactor that has reverted to the deactivated state for an individual RESS in a multi RESS system, employing a pre-charge circuit. The concepts include a system and methodology to re-activate a first contactor that has reverted to the deactivated state for an individual RESS in a multi RESS system.

While the best modes for carrying out the disclosure have been described in detail, those familiar with the art to which this disclosure relates will recognize various alternative designs and embodiments lying within the scope of the appended claims. It is intended that the matter contained in the above description and/or shown in the accompanying drawings shall be interpreted as illustrative and not as limiting.

What is claimed is:

1. A system for a high-voltage (HV) battery pack, the system comprising:
   a plurality of rechargeable energy storage devices (RESSs), the plurality of RESSs being electrically connectable to an external load via a high-voltage electric power bus;
   a plurality of current sensors;
   a plurality of pre-charge circuits arranged in parallel with a corresponding plurality of first electrical contactors; and
   a controller, in communication with the plurality of current sensors, and operatively connected to the plurality of first electrical contactors and the plurality of pre-charge circuits;
   wherein each of the plurality of RESSs is monitored via one of the plurality of current sensors;
   wherein each of the plurality of RESSs is electrically connectable to the high-voltage electric power bus via a respective one of the plurality of pre-charge circuits that is arranged in parallel with a respective one of the plurality of first electrical contactors; and
   wherein the controller includes an instruction set, the instruction set being executable to:
      monitor, via the plurality of current sensors, a plurality of current levels between the plurality of RESSs and the high-voltage electric power bus,
      detect a low current level from one of the plurality of current sensors,
      identify one of the RESSs corresponding to the one of the plurality of current sensors associated with the low current level,
      activate the respective one of the pre-charge circuits corresponding to the one of the RESSs,
      monitor, via the one of the plurality of current sensors, an electrical current for the one of the RESSs, and
      determine a state of the respective first electrical contactor based upon the electrical current for the one of the RESSs.

2. The system of claim 1, wherein the instruction set being executable to determine the state of the respective first electrical contactor based upon the electrical current comprises the instruction set being executable to determine that the respective first electrical contactor is in a deactivated state when the electrical current is greater than a threshold current when the respective pre-charge circuit is activated.

3. The system of claim 1, wherein the instruction set being executable to detect the low current level from one of the plurality of current sensors comprises the instruction set being executable to detect that one of the plurality of current levels is less than a minimum threshold current level.

4. The system of claim 1, wherein the plurality of RESSs are electrically connectable in series to the external load via the high-voltage electric power bus.

5. The system of claim 1, comprising a subset of the plurality of RESSs being electrically connectable in parallel to the external load via the high-voltage electric power bus.

6. The system of claim 1, wherein each of the plurality of pre-charge circuits comprises a controllable switch connected in series with a resistor.

7. The system of claim 1, further comprising the instruction set being executable to:
   activate the respective one of the pre-charge circuits corresponding to the one of the RESSs,
   monitor, via the plurality of current sensors, a plurality of electrical current levels between the plurality of RESSs and the high-voltage electric power bus, and
   determine a state of the respective first electrical contactor based upon the electrical current for the one of the RESSs and the plurality of electrical current levels between the plurality of RESSs and the high-voltage electric power bus.

8. The system of claim 7, wherein the instruction set being executable to determine the state of the respective first electrical contactor based upon the plurality of electrical current levels between the plurality of RESSs and the high-voltage electric power bus comprises the instruction set being executable to determine that the respective first electrical contactor is in a deactivated state when the plurality of electrical current levels between the plurality of RESSs and the high-voltage electric power bus reflect a corresponding change.

9. The system of claim 1, further comprising the instruction set being executable to re-activate the respective first electrical contactor when it is determined that the respective first electrical contactor is deactivated.

10. The system of claim 1, wherein the instruction set being executable to determine the state of the respective first electrical contactor based upon the electrical current comprises the instruction set being executable to determine that the respective first electrical contactor is in an activated state when a change in the electrical current is less than a threshold current when the respective pre-charge circuit is activated.

11. A method for monitoring a high-voltage (HV) battery pack configured as a plurality of rechargeable energy storage devices (RESSs) that are electrically connectable to a high-voltage electric power bus via a first contactor and a pre-charge circuit, the method comprising:
  monitoring, via a plurality of sensors, a plurality of power levels between the plurality of RESSs and the high-voltage electric power bus,
  detecting a low power level from one of the plurality of sensors,
  identifying one of the RESSs corresponding to the one of the plurality of sensors associated with the low power level,
  activating a respective one of the pre-charge circuits corresponding to the one of the RESSs,
  monitoring, via the one of the plurality of sensors, an electrical power for the one of the RESSs, and
  determining a state of a respective first electrical contactor based upon the electrical power for the one of the RESSs.

12. The method of claim 11, wherein determining the state of the respective first electrical contactor based upon the electrical power comprises determining that the respective first electrical contactor is in a deactivated state when the electrical power is greater than a threshold power when a respective pre-charge circuit is activated.

13. The method of claim 11, wherein detecting the low power level from one of the plurality of sensors comprises detecting that one of the plurality of power levels is less than a minimum threshold power level.

14. The method of claim 11, wherein the plurality of RESSs are electrically connectable in series to an external load via the high-voltage electric power bus.

15. The method of claim 11, comprising a subset of the plurality of RESSs being electrically connectable in parallel to an external load via the high-voltage electric power bus.

16. The method of claim 11, wherein each of the pre-charge circuits comprises a controllable switch connected in series with a resistor.

17. The method of claim 11, further comprising:
  activating the respective one of the pre-charge circuits corresponding to the one of the RESSs,
  monitoring, via the plurality of sensors, a plurality of electrical power levels between the plurality of RESSs and the high-voltage electric power bus, and
  determining a state of a respective first electrical contactor based upon the electrical power for the one of the RESSs and the plurality of electrical power levels between the plurality of RESSs and the high-voltage electric power bus.

18. The method of claim 17, wherein determining the state of the respective first electrical contactor based upon the plurality of electrical power levels between the plurality of RESSs and the high-voltage electric power bus comprises determining that the respective first electrical contactor is in a deactivated state when the plurality of electrical power levels between the plurality of RESSs and the high-voltage electric power bus reflect a corresponding change.

19. The method of claim 11, further comprising re-activating the respective first electrical contactor when it is determined that the respective first electrical contactor is deactivated.

20. A vehicle, comprising:
  a high-voltage (HV) battery pack that is electrically connected to an electric drive system that is coupled to a propulsion unit; and
  a system for the high-voltage (HV) battery pack, the system comprising:
  a plurality of rechargeable energy storage devices (RESSs), the plurality of RESSs being electrically connectable to an external load via a high-voltage electric power bus;
  a plurality of current sensors;
  a plurality of pre-charge circuits arranged in parallel with a corresponding plurality of first electrical contactors; and
  a controller, in communication with the plurality of current sensors, and operatively connected to the plurality of first electrical contactors and the plurality of pre-charge circuits;
  wherein each of the plurality of RESSs is monitored via one of the plurality of current sensors;
  wherein each of the plurality of RESSs is electrically connectable to the high-voltage electric power bus via a respective one of the plurality of pre-charge circuits that is arranged in parallel with a respective one of the plurality of first electrical contactors; and
  wherein the controller includes an instruction set, the instruction set being executable to:
    monitor, via the plurality of current sensors, a plurality of current levels between the plurality of RESSs and the high-voltage electric power bus,
    detect a low current level from one of the plurality of current sensors,
    identify one of the RESSs corresponding to the one of the plurality of current sensors associated with the low current level,
    activate the respective one of the pre-charge circuits corresponding to the one of the RESSs,
    monitor, via the one of the plurality of current sensors, an electrical current for the one of the RESSs, and
    determine a state of the respective first electrical contactor based upon the electrical current for the one of the RESSs.

* * * * *